(12) United States Patent
Hashimoto et al.

(10) Patent No.: US 10,512,214 B2
(45) Date of Patent: Dec. 24, 2019

(54) LAWN MOWER WITH WATERPROOFED DRIVING SOURCE

(71) Applicant: HONDA MOTOR CO., LTD., Tokyo (JP)

(72) Inventors: Takeshi Hashimoto, Wako (JP); Hiroaki Uchitani, Wako (JP); Takahiro Yamamoto, Wako (JP); Susumu Okubo, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 78 days.

(21) Appl. No.: 15/960,721

(22) Filed: Apr. 24, 2018

(65) Prior Publication Data

US 2018/0235146 A1    Aug. 23, 2018

Related U.S. Application Data

(63) Continuation of application No. PCT/JP2015/085949, filed on Dec. 24, 2015.

(51) Int. Cl.
*A01D 34/81* (2006.01)
*A01D 34/74* (2006.01)
(Continued)

(52) U.S. Cl.
CPC ........... *A01D 34/81* (2013.01); *A01D 34/008* (2013.01); *A01D 34/64* (2013.01); *A01D 34/74* (2013.01);
(Continued)

(58) Field of Classification Search
CPC .... A01D 34/001; A01D 34/003; A01D 34/74; A01D 34/81; A01D 34/826; A01D 34/828
See application file for complete search history.

(56) References Cited

U.S. PATENT DOCUMENTS 3,212,244 A * 10/1965 Wilgus ................... A01D 34/74
56/17.1
5,894,717 A   4/1999 Yamashita et al.
(Continued)

FOREIGN PATENT DOCUMENTS

CH         499253 A    11/1970
EP    2 656 719 A1    10/2013
(Continued)

OTHER PUBLICATIONS

European Search Report issued for European Patent Application No. 15911315.8 dated Nov. 30, 2018.
(Continued)

*Primary Examiner* — Alicia Torres
(74) *Attorney, Agent, or Firm* — Thomas | Horstemeyer, LLP (57) ABSTRACT

A lawn mower includes a driving source mounting portion formed in a traveling frame, a driving source mounted in the driving source mounting portion, and a lawn mowing unit attached to the driving source. A bottom surface of the traveling frame includes a frame-side seal surface surrounding the lower end of the driving source mounting portion, and a lawn mowing unit peripheral surface surrounding the frame-side seal surface. A waterproof member is in tight contact with the frame-side seal surface. The lawn mowing unit peripheral surface is formed over a range from an outer circumferential edge of the frame-side seal surface to an outer circumferential edge of the lawn mowing unit. A boundary between the frame-side seal surface and lawn mowing unit peripheral surface is formed into the shape of a step.

5 Claims, 5 Drawing Sheets

(51) Int. Cl.
*A01D 34/78* (2006.01)
*A01D 34/00* (2006.01)
*A01D 34/64* (2006.01)
*F16J 15/52* (2006.01)
*A01D 69/02* (2006.01)
*A01D 101/00* (2006.01)

(52) U.S. Cl.
CPC ............ *A01D 34/78* (2013.01); *F16J 15/525* (2013.01); *A01D 69/02* (2013.01); *A01D 2101/00* (2013.01)

(56) References Cited

U.S. PATENT DOCUMENTS

| | | | |
|---|---|---|---|
| 5,910,091 | A | 6/1999 | Iida et al. |
| 6,516,598 | B1 * | 2/2003 | Notaras ................. A01D 34/001 172/17 |
| 2012/0023880 | A1 * | 2/2012 | Messina ............... A01D 34/008 56/10.2 E |
| 2015/0181805 | A1 * | 7/2015 | Elonsson ............. A01D 34/008 56/14.7 |

FOREIGN PATENT DOCUMENTS

| | | |
|---|---|---|
| JP | H10-084739 A | 4/1998 |
| JP | 2014-147353 A | 8/2014 |

OTHER PUBLICATIONS

International Search Report dated Mar. 15, 2016, in International Application No. PCT/JP2015/085949.

* cited by examiner

LAWN MOWER WITH WATERPROOFED DRIVING SOURCE

This application is a continuation of International Patent Application No. PCT/JP2015/085949, filed on Dec. 24, 2015, the entire content of which is incorporated herein by reference.

TECHNICAL FIELD

The present invention relates to a lawn mower improved in waterproofness.

BACKGROUND ART

Lawn mowers include an autonomous lawn mower capable of autonomously traveling without being steered by a worker. This autonomous lawn mower can automatically travel on the lawn by traveling wheels, and mow the lawn by a cutter blade which rotates almost horizontally, and is known as a so-called robotic lawn mower. A lawn mower like this is known from European Patent Application Publication No. 2656719.

This lawn mower known from European Patent Application Publication No. 2656719 has the arrangement of an autonomous lawn mower (robotic lawn mower) capable of air-cooling the interior. The lawn mower includes a motor having a downward rotating shaft, a motor holding member holding the motor, a holding member mounting unit in which the motor holding member is mounted to be vertically movable, a traveling frame having the holding member mounting unit, and a cover covering the traveling frame from above. A lawn mowing unit is attached to the rotating shaft of the motor. The lawn mowing unit is positioned below the traveling frame, and can mow the lawn by horizontally rotating. Traveling wheels for automatic traveling are attached to the traveling frame.

A space formed by the traveling frame and cover accommodates various electric parts such as the motor, a batter, and electronic components. To air-cool these electric parts, external air is taken in through a vent hole of the cover. Air having cooled the electric parts is exhausted from the bottom surface of the traveling frame through an opening at the lower end of the holding member mounting unit.

When lawn mowing is performed by the lawn mower, cut grass and mud can attach to the bottom surface of the traveling frame and the lawn mowing unit. To clean up the lawn mower, the bottom surface of the traveling frame and the lawn mowing unit need only be washed with high-pressure cleaning water. However, the lower end of the holding member mounting unit is exposed from the bottom surface of the traveling frame. In addition, the opening for exhausting air having cooled the electric parts is formed in the lower end of the holding member mounting unit. To solve this problem, some waterproof device can be formed to prevent the cleaning water from entering the interior of the lawn mower. However, if the waterproof device is formed, the waterproof structure may become complicated, and the cost of the lawn mower increases, so some improvement is necessary.

SUMMARY OF INVENTION

It is an object of the present invention to provide a technique capable of increasing the waterproofness of a lawn mower by a simple arrangement.

According to an aspect of the present invention, there is provided a lawn mower comprising: a traveling frame provided with traveling wheels; a driving source mounting portion formed in the traveling frame; a driving source mounted in the driving source mounting portion and including a downward rotating shaft; and a lawn mowing unit positioned below the traveling frame and attached to the rotating shaft, a lower end of the driving source mounting portion and a lower end of the driving source being exposed from a bottom surface of the traveling frame, wherein when the traveling frame is viewed from below, a flat annular frame-side seal surface which is positioned so as to surround the lower end of the driving source mounting portion and an annular lawn mowing unit peripheral surface which is positioned so as to surround the frame-side seal surface are formed in the bottom surface of the traveling frame, a waterproof member configured to waterproof a portion between the bottom surface of the traveling frame and the lower end of the driving source is in tight contact with the frame-side seal surface, when the lawn mower is viewed from below, the lawn mowing unit peripheral surface is formed over a range from an outer circumferential edge of the frame-side seal surface to at least an outer circumferential edge of the lawn mowing unit, at least an inner circumferential edge of the lawn mowing unit peripheral surface is positioned higher than the outer circumferential edge of the frame-side seal surface, and a boundary between the outer circumferential edge of the frame-side seal surface and the inner circumferential edge of the lawn mowing unit peripheral surface is formed into a shape of a step over an entire circumference.

Further features of the present invention will become apparent from the following description of exemplary embodiments (with reference to the attached drawings).

DESCRIPTION OF EMBODIMENTS

Embodiments according to the present invention will be explained below with reference to the accompanying drawings.

Figure 1:
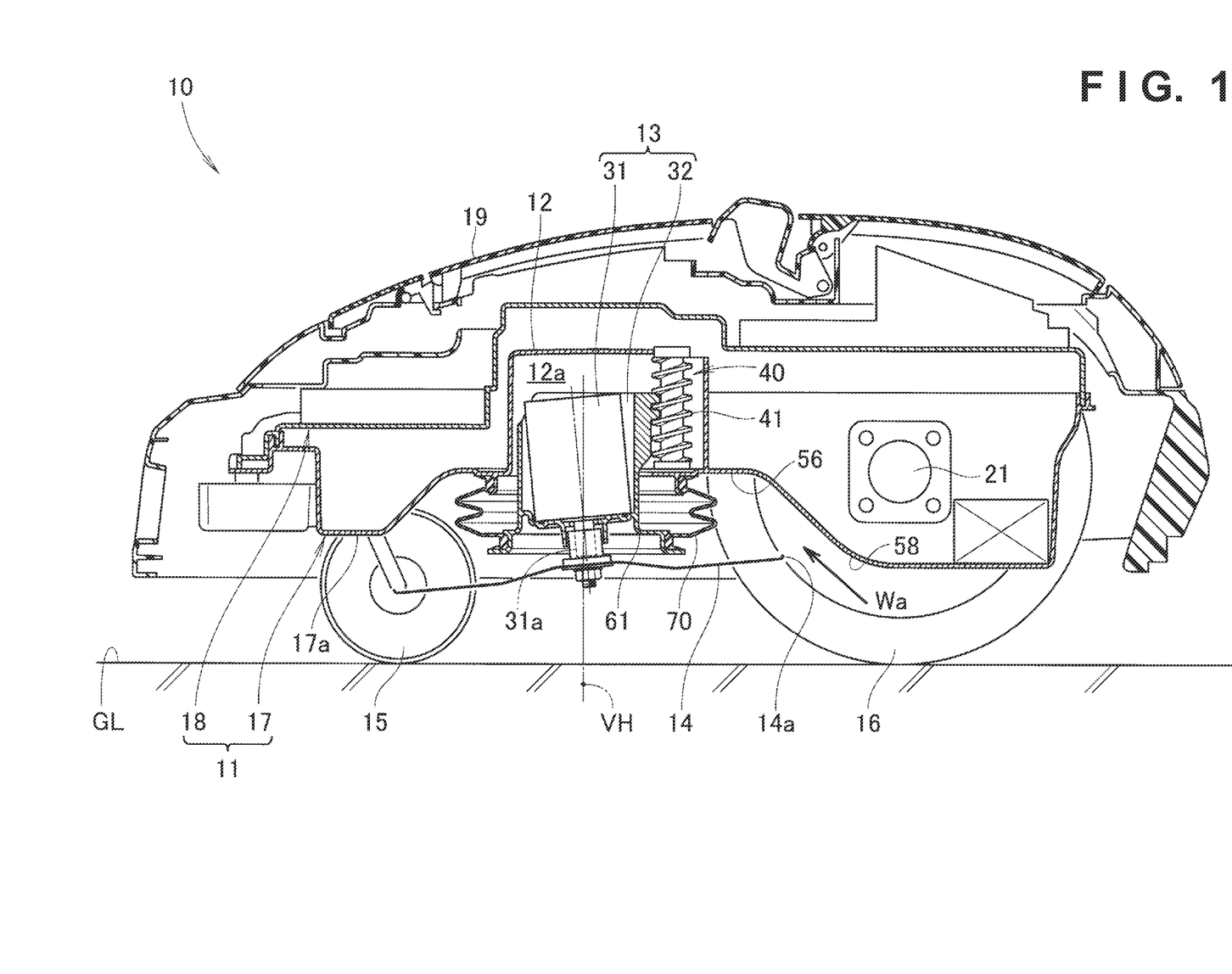
FIG. 1 is a sectional view showing a lawn mower according to the present invention sideways.

A lawn mower 10 according to an embodiment will be explained with reference to the accompanying drawings. As shown in FIG. 1, the lawn mower 10 is a so-called autonomous lawn mower capable of autonomously traveling without being steered by a worker. The lawn mower 10 can cut the grass by a lawn mowing unit 14 which rotates almost horizontally while automatically traveling on lawn GL by four traveling wheels 15 and 16 (only the right side is shown), and is known as a so-called robotic lawn mower.

The lawn mower 10 includes a traveling frame 11, a driving source mounting portion 12, a driving source 13, and the lawn mowing unit 14.

The traveling frame 11 is provided with the traveling wheels 15 and 16. The traveling frame 11 includes an under frame 17 provided with the four traveling wheels 15 and 16, and an upper frame 18 formed on the under frame 17. The upper frame 18 can be detached from the under frame 17. Furthermore, the upper frame 18 is covered with a decorative cover 19 from above.

The four traveling wheels 15 and 16 include left and right front wheels 15 in the front portion of the traveling frame 11, and left and right rear wheels 16 in the rear portion of the traveling frame 11. The left and right rear wheels 16 are individually driven by left and right traveling motors 21 (left and right electric motors 21). The lawn mower 10 travels straight forward or backward when the left and right traveling motors 21 rotate forward at equal speeds, or rotate reversely at equal speeds. Also, the lawn mower 10 turns when one of the left and right traveling motors 21 rotates reversely.

The driving source mounting portion 12 is formed in the traveling frame 11. More specifically, in the center of the under frame 17 of the traveling frame 11, the driving source mounting portion 12 having an almost rectangular shape in a planar view and swelling upward is integrated with the under frame 17. The lower end of the driving source mounting portion 12 is exposed from a bottom surface 17a of the traveling frame 11, and has an open lower portion. Thus, an accommodating space 12a having an open lower end is formed inside the driving source mounting portion 12. The accommodating space 12a will be referred to as "an accommodating portion 12a" hereinafter.

The driving source 13 of the lawn mowing unit 14 is mounted in the driving source mounting portion 12. The driving source 13 includes an electric motor 31 for driving the lawn mowing unit 14, and a motor housing 32 housing the electric motor 31.

The electric motor 31 has a so-called downward rotational axis 31a (an output shaft 31a) which extends to a portion below the traveling frame 11, that is, extends toward the lawn GL below from the lower end. The rotating shaft 31a, that is, the rotating shaft 31a of the driving source 13 extends in the vertical direction of the traveling frame 11, and is almost perpendicular to the horizontal lawn GL, that is, the ground GL. Preferably, the rotating shaft 31a slightly inclines backward and downward from above with respect to a vertical line VH. This prevents the lawn mowing unit 14 from rubbing the lawn surface after the lawn mower 10 travels forward and the lawn mowing unit 14 cuts the grass.

Figure 2:
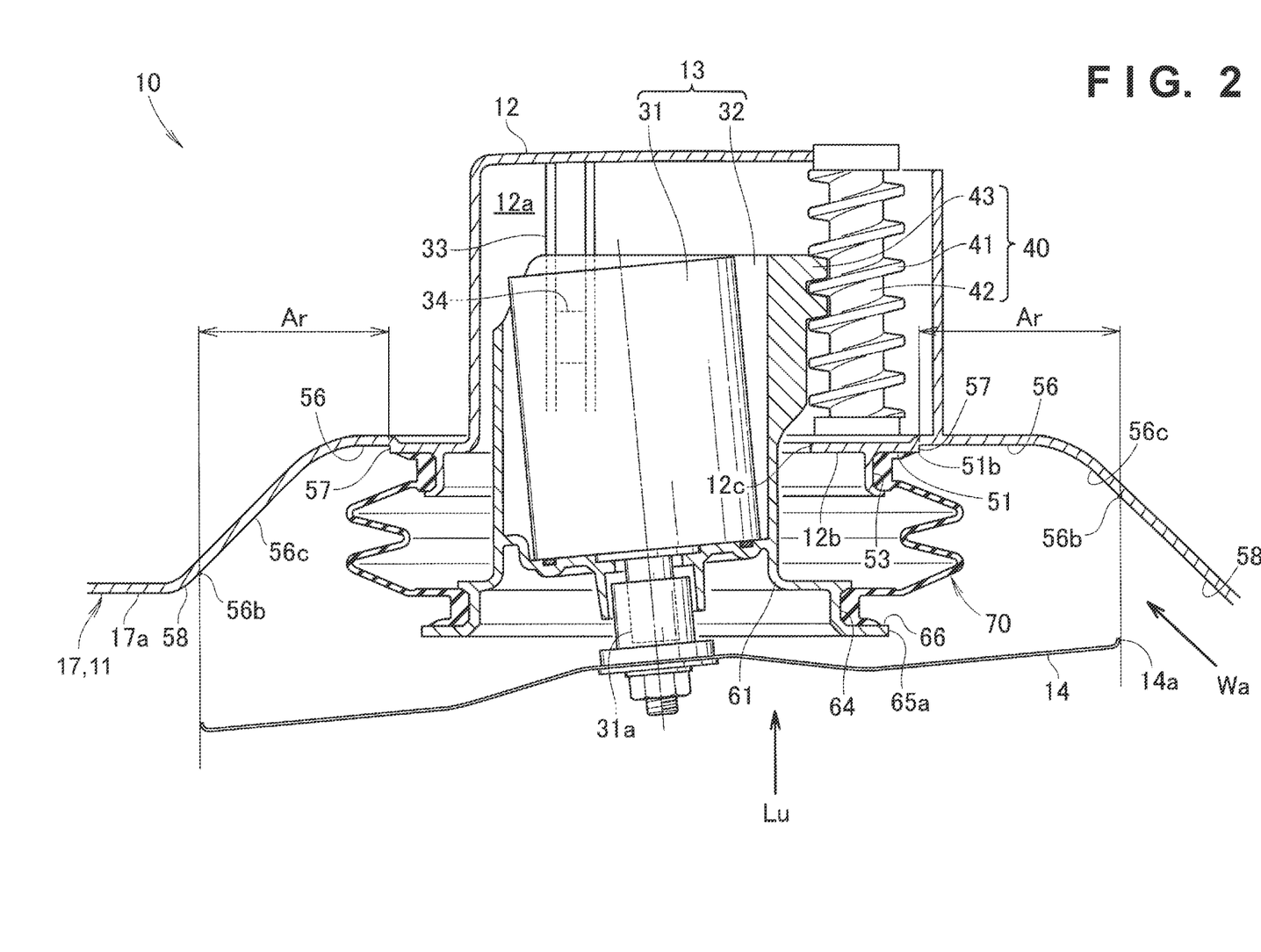
FIG. 2 is an enlarged view of a traveling frame, cutter blade, cutter blade driving motor, and motor holding member shown in FIG. 1.

As shown in FIG. 2, the motor housing 32 (the motor holding member 32) is accommodated in the accommodating portion 12a of the driving source mounting portion 12. The motor housing 32 incorporates and holds the electric motor 31, and can vertically move with respect to the traveling frame 11. That is, the rotation of the motor housing 32 is regulated, but the vertical movement thereof is permitted, with respect to the under frame 17. For example, a combined structure of guide rails 33 and a slider 34 which is vertically movable as it is guided by the guide rails 33 permits only the vertical movement of the motor housing 32. The guide rails 33 are formed on the inner wall surface of the driving source mounting portion 12 and vertically extends. The slider 34 is formed on the outer wall surface of the motor housing 32.

A vertical driving mechanism 40 vertically moves the motor housing 32. For example, the vertical driving mechanism 40 includes a screw portion 41 (including a worm), and a rack 43 meshed with the screw portion 41. The screw portion 41 is a male screw formed along the axis of a driving shaft 42 extending in the vertical direction. The driving shaft 42 is parallel to the vertical line VH. The rack 43 is formed on the outer wall of the motor housing 32. A plurality of teeth formed on the rack 43 are arrayed in the vertical direction. The screw portion 41 and driving shaft 42 are accommodated in the accommodating portion 12a. The screw portion 41 is rotated by a vertical movement electric motor (not shown) or rotated manually.

The lawn mowing unit 14 (cutter blade 14) is positioned blow the center of the traveling frame 11, and driven by the driving source 13. That is, the lawn mowing unit 14 is attached to the rotating shaft 31a of the driving source 13.

A portion between the bottom surface 17a of the traveling frame 11 and the lower end of the motor housing 32 is sealed by a waterproof member 70. A seal structure obtained by the waterproof member 70 will be explained in detail below.

Figure 3:
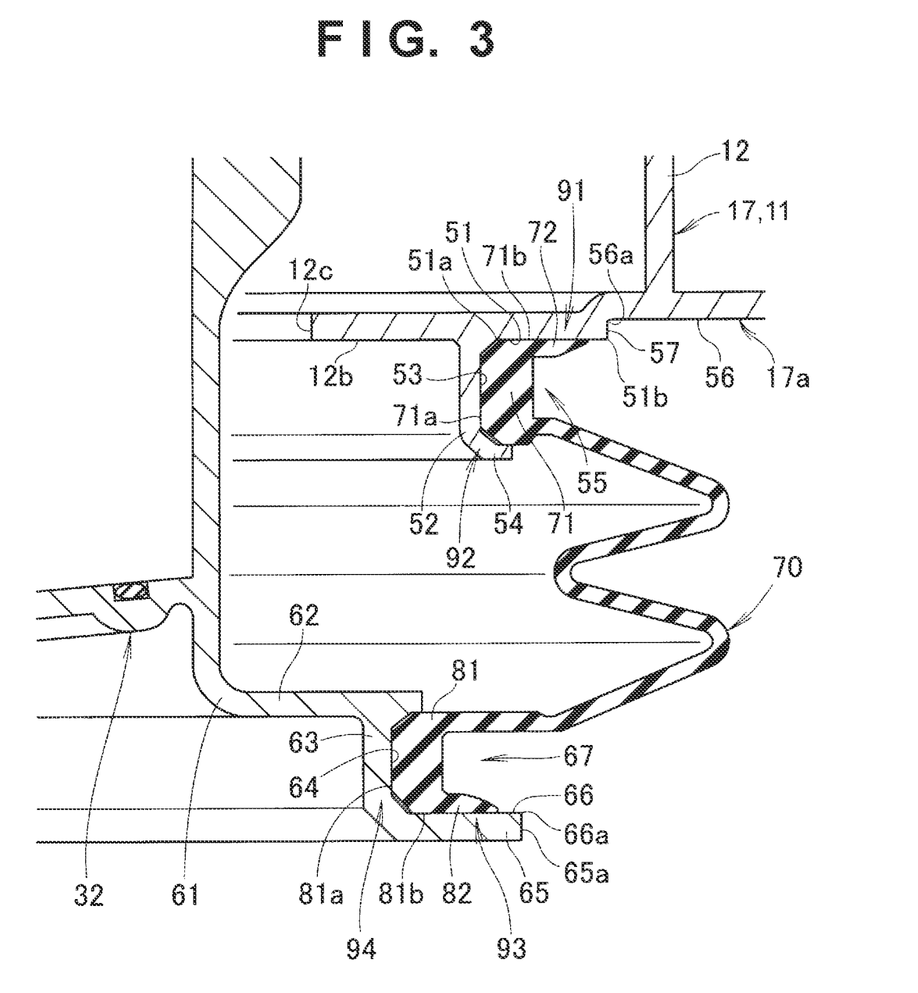
FIG. 3 is an enlarged view of main parts of the bottom surface of the traveling frame, the motor holding member, and the waterproof structure of a waterproof member shown in FIG. 2.
Figure 4:
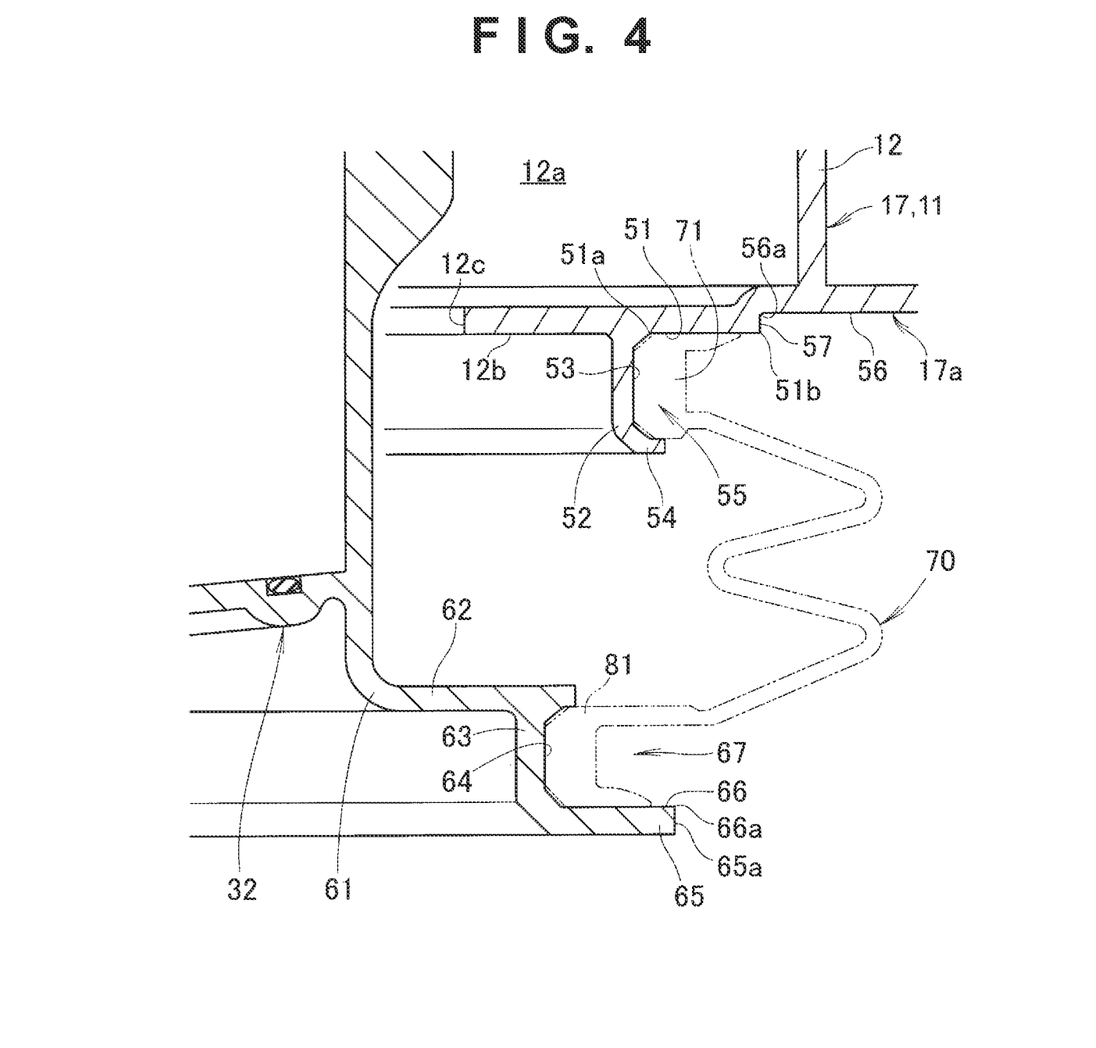
FIG. 4 is a sectional view of main parts of the bottom surface of the traveling frame and the motor holding member shown in FIG. 3.

As shown in FIGS. 2 to 4, the bottom surface 17a of the traveling frame 11 has a frame-side seal surface 51 and a lawn mowing unit peripheral surface 56.

The frame-side seal surface 51 is a flat annular portion which is positioned so as to surround a lower end 12b of the driving source mounting portion 12 when the traveling frame 11 is viewed from below (in the direction of an arrow Lu in FIG. 2), and integrated with the traveling frame 11. More specifically, an opening 12c is formed to extend downward through the lower end 12b of the driving source mounting portion 12. The opening 12c enables the motor housing 32 to project downward from the bottom surface 17a of the traveling frame 11, and communicates with the accommodating portion 12a. The frame-side seal surface 51 is an almost horizontal annular surface surrounding the opening 12c, and formed in the lower surface 17a of the under frame 17 of the traveling frame 11.

In addition, the annular frame-side seal surface 51 has an annular downward portion 52 extending downward over the entire circumference from an inner circumferential edge 51a. An outer circumferential surface 53 of the downward portion 52 will be referred to as "a downward seal surface 53" hereinafter. The downward seal surface 53 extends downward over the entire circumference from the inner circumferential end 51a of the annular frame-side seal surface 51. That is, the frame-side seal surface 51 has the downward seal surface 53.

The inner circumferential end 51a of the frame-side seal surface 51 is formed into the shape of a true circle when the traveling frame 11 is viewed from below. The downward seal surface 53 is positioned concentrically to the frame-side seal surface 51, and formed into the shape of a true circle when the traveling frame 11 is viewed from below (in the direction of the arrow Lu in FIG. 2). A flange 54 is integrated with the outer edge of the lower end of the downward portion 52. The flange 54 is formed as an annular plate radially spreading outward from the outer edge of the lower end of the downward portion 52, and practically parallel to the frame-side seal surface 51.

An annular groove 55 formed by the frame-side seal surface 51, the downward seal surface 53, and the upper surface of the flange 54 will be referred to as "an upper sealing groove 55" hereinafter.

The lawn mowing unit peripheral surface 56 is an annular portion positioned so as to surround the frame-side seal surface 51 when the traveling frame 11 is viewed from below (in the direction of the arrow Lu in FIG. 2), and integrated with the traveling frame 11. Reference numeral

56a denotes the inner circumferential edge of the lawn mowing unit peripheral surface 56. Reference numeral 56b denotes the outer circumferential edge of the lawn mowing unit peripheral surface 56. When the lawn mower 10 is viewed from below (in the direction of the arrow Lu in FIG. 2), the outer circumferential edge 56b of the lawn mowing unit peripheral surface 56 is positioned on the projection line of the outer circumferential edge 14a of the lawn mowing unit 14.

When the lawn mower 10 is viewed from below, the lawn mowing unit peripheral surface 56 is formed over a range Ar from the outer circumferential edge 51b of the frame-side seal surface 51 to at least an outer circumferential edge 14a of the lawn mowing unit 14. The diameter of the outer circumferential edge 14a of the lawn mowing unit 14 is larger than that of the outer circumferential edge 51b of the frame-side seal surface 51.

At least the inner circumferential edge 56a of the lawn mowing unit peripheral surface 56 is positioned higher than an outer circumferential edge 51b of the frame-side seal surface 51. A boundary 57 between the outer circumferential edge 51b of the frame-side seal surface 51 and the inner circumferential edge 56a of the lawn mowing unit peripheral surface 56 is formed into the shape of a step over the entire circumference.

The annular lawn mowing unit peripheral surface 56 is positioned higher than other portion 58 of the bottom surface 17a of the traveling frame 11, which is positioned so as to surround the lawn mowing unit peripheral surface 56, and inclines upward and inward in the radial direction from the outer circumferential edge 56b of the lawn mowing unit peripheral surface 56.

The motor housing 32 projects downward from the bottom surface 17a of the traveling frame 11, and has a housing-side seal surface 66 on a projecting portion 61 (a lower end 61 of the motor housing 32). The lower end 61 of the motor housing 32 forms the lower end of the driving source 13. The lower end 61 of the motor housing 32 will properly be rephrased to "the lower end 61 of the driving source 13" hereinafter.

More specifically, an upper flange 62 is integrated with the outer edge of the lower end 61 of the motor housing 32. The upper flange 62 is formed as an annular plate radially spreading outward from the outer edge of the lower end of the motor housing 32, and practically parallel to the frame-side seal surface 51. The upper flange 62 has an annular downward portion 63 extending downward from the lower surface. An outer circumferential surface 64 of the downward portion 63 will be referred to as "a downward seal surface 64" hereinafter. The downward seal surface 64 extends downward over the entire circumference from the lower surface of the upper flange 62. That is, the lower surface of the upper flange 62 has the downward seal surface 64.

Furthermore, a lower flange 65 is integrated with the outer edge of the lower end of the downward portion 63. The lower flange 65 is formed as an annular plate radially spreading outward from the outer edge of the lower end of the downward portion 63, and practically parallel to the upper flange 62. An upper surface 66 of the lower flange 65 will be referred to as "a housing-side seal surface 66" hereinafter. The housing-side seal surface 66 is a flat annular surface facing the frame-side seal surface 51. An outer circumferential edge 66a of the housing-side seal surface 66 has a downward surface 65a extending downward over the entire circumference from the outer circumferential edge 66a. The downward surface 65a is formed by an outer circumferential surface 65a of the lower flange 65.

An annular groove 67 formed by the lower surface of the upper flange 62, the downward seal surface 64, and the upper surface of the lower flange 65 will be referred to as "a lower sealing groove 67" hereinafter.

Figure 5:
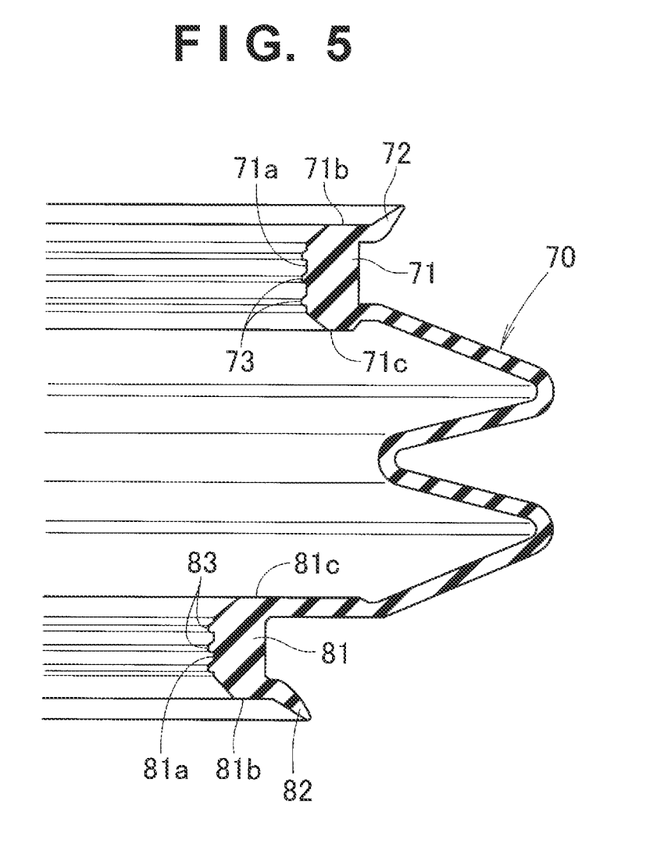
FIG. 5 is a sectional view of main parts of the waterproof member shown in FIG. 3.

As shown in FIGS. 2, 3, and 5, the waterproof member 70 is made of a flexible material such as rubber, and waterproofs a portion between the bottom surface 17a of the traveling frame 11 and the lower end 61 of the driving source 13. The waterproof member 70 is formed by a cylindrical boot (bellows) which is a bellows capable of expanding and contracting in the vertical direction of the lawn mower 10. An upper tight contact portion 71 is integrated with the upper end of the waterproof member 70. A lower tight contact portion 81 is integrated with the lower end of the waterproof member 70. The upper and lower tight contact portions 71 and 81 are each formed into an annular shape concentric to the waterproof member 70, and has an almost rectangular section.

A sealing lip 72 is formed on the outer edge of the upper end of the upper tight contact portion 71. The sealing lip 72 extends outward in the radial direction and upward from the outer edge of the upper end of the upper tight contact portion 71. A plurality of sealing projecting lines 73 arrayed in the vertical direction of the waterproof member 70 are formed on an inner circumferential surface 71a of the upper tight contact portion 71. The plurality of sealing projecting lines 73 are formed over the entire circumference in the circumferential direction of the inner circumferential surface 71a of the upper tight contact portion 71.

Like the upper tight contact portion 71, the lower tight contact portion 81 has a sealing lip 82 and a plurality of sealing projecting lines 83. The sealing lip 82 extends outward in the radial direction and downward from the outer edge of the lower end of the lower tight contact portion 81. The plurality of sealing projecting lines 83 are formed on an inner circumferential surface 81a of the lower tight contact portion 81, and arrayed in the vertical direction of the waterproof member 70.

The upper tight contact portion 71 is fitted in a compressed state in the upper sealing groove 55. More specifically, the sealing lip 72 is in elastically tight contact with the frame-side seal surface 51. Since the sealing lip 72 elastically deforms, an upper end face 71b of the upper tight contact portion 71 is also in tight contact with the frame-side seal surface 51. As a consequence, the upper end portion of the waterproof member 70 is in tight contact with the frame-side seal surface 51. The plurality of sealing projecting lines 73 are in elastically tight contact with the downward seal surface 53. Since the plurality of sealing projecting lines 73 elastically deform, the inner circumferential surface 71a of the upper tight contact portion 71 is also in tight contact with the downward seal surface 53. A lower end face 71c of the upper tight contact portion 71 is in elastically tight contact with the upper surface of the flange 54. Consequently, the upper end portion of the waterproof member 70 is in tight contact not only with the frame-side seal surface 51, but also with the downward seal surface 53 and the upper surface of the flange 54.

The lower tight contact portion 81 is fitted in a compressed state in the lower sealing groove 67. More specifically, the sealing lip 82 is in elastically tight contact with the housing-side seal surface 66. Since the sealing lip 82 elastically deforms, a lower end face 81b of the lower tight contact portion 81 is also in tight contact with the housing-side seal surface 66. As a consequence, the lower end portion of the waterproof member 70 is in tight contact with the housing-side seal surface 66. The plurality of sealing projecting lines 83 are in elastically tight contact with the downward seal surface 64. Since the plurality of sealing projecting lines 83 elastically deform, the inner circumferential surface 81a of the lower tight contact portion 81 is also in tight contact with the downward seal surface 64. An upper end face 81c of the lower tight contact portion 81 is in elastically tight contact with the lower surface of the upper flange 62. Consequently, the lower end portion of the waterproof member 70 is in tight contact not only with the housing-side seal surface 66, but also with the downward seal surface 64 and the lower surface of the upper flange 62.

Next, the function of the lawn mower 10 having the above arrangement will be explained. As shown in FIGS. 2 and 3, the inner circumferential edge 56a of the lawn mowing unit peripheral surface 56 is positioned higher than the outer circumferential edge 51b of the frame-side seal surface 51. In addition, the boundary 57 between the outer circumferential edge 51b of the frame-side seal surface 51 and the inner circumferential edge 56a of the lawn mowing unit peripheral surface 56 is formed into the shape of a step. Therefore, when high-pressure cleaning water is sprayed against the lower portion of the traveling frame 11, that is, against the lawn mowing unit peripheral surface 56 from the side of the lawn mowing unit 14, as indicated by an arrow Wa (see FIG. 2), the cleaning water flows toward the frame-side seal surface 51 along the lawn mowing unit peripheral surface 56, but is easily interrupted by the step in the boundary 57 between the frame-side seal surface 51 and lawn mowing unit peripheral surface 56. That is, the pressure of the cleaning water can largely be reduced by the step.

Since the interrupted cleaning water scatters to the surroundings, the cleaning water hardly directly splashes to the tight contact portion (sealed portion) between the frame-side seal surface 51 and waterproof member 70. Also, even when the cleaning water flows onto the frame-side seal surface 51 over the step, the water flow has weakened. As a consequence, it is possible to increase the waterproofness which prevents the cleaning water from entering the waterproof member 70 from the sealed portion. In addition, since the step need only be formed on the bottom surface 17a of the traveling frame 11, the arrangement of the waterproof structure is simple, so the cost of the lawn mower 10 can be reduced.

Furthermore, as shown in FIGS. 2 and 3, the housing-side seal surface 66 is a flat annular surface facing the frame-side seal surface 51. The outer circumferential edge 66a of the housing-side seal surface 66 has the downward surface 65a extending downward over the entire circumference from the outer circumferential edge 66a. Accordingly, when high-pressure cleaning water is sprayed against the lower portion of the traveling frame 11, that is, against the lower end portion of the waterproof member 70 from the side of the lawn mowing unit 14, the cleaning water flows toward the housing-side seal surface 66, but is easily interrupted by the downward surface 65a. That is, the pressure of the cleaning water can largely be reduced by the downward surface 65a.

Since the interrupted cleaning water scatters to the surroundings, the cleaning water hardly directly splashes to the tight contact portion (sealed portion) between the housing-side seal surface 66 and waterproof member 70. Also, even when the cleaning water flows onto the housing-side seal surface 66 over the downward surface 65a, the water flow has weakened. Consequently, it is possible to increase the waterproofness which prevents the cleaning water from entering the waterproof member 70 from the sealed portion.

In addition, it is only necessary to form the downward surface 65a which extends downward over the entire circumference from the outer circumferential edge 66a of the housing-side seal surface 66. Accordingly, the arrangement of the waterproof structure is simple, so the cost of the lawn mower 10 can be reduced.

As shown in FIGS. 1 and 2, the annular lawn mowing unit peripheral surface 56 is positioned higher than "the other portion 58" of the bottom surface 17a of the traveling frame 11, which is positioned so as to surround the lawn mowing unit peripheral surface 56. That is, since "the other portion 58" is lower than the lawn mowing unit peripheral surface 56, a layout space for laying out parts on the traveling frame 11 can be widened accordingly. The depth from the lower surface of the other portion 58 to the lawn mowing unit peripheral surface 56 increases.

On the other hand, the annular lawn mowing unit peripheral surface 56 inclines upward and inward from the outer circumferential edge 56b of the annular lawn mowing unit peripheral surface 56. Accordingly, when the cleaning water is sprayed against the inclined surface 56c which inclines upward, the inclined surface 56c can guide the cleaning water toward the center of the lawn mowing unit peripheral surface 56. The guided cleaning water flows toward the step along the lawn mowing unit peripheral surface 56. Therefore, the cleaning water can clean the lawn mowing unit peripheral surface 56 as evenly as possible. In addition, the cleaning water can be interrupted by the step. Thus, it is possible to easily and reliably wash the lawn mowing unit peripheral surface 56 with water while preventing the cleaning water from entering the waterproof member 70 from the sealed portion.

Furthermore, the portion of the motor housing 32, which projects downward from the bottom surface 17a of the traveling frame 11, can be covered with the waterproof member 70. In addition, since the lower end portion of the waterproof member 70 is in tight contact with the housing-side seal surface 66, it is possible to prevent the cleaning water from entering the interior from the lower end portion of the waterproof member 70. Accordingly, it is possible to increase the waterproofness which prevents the cleaning water from entering the waterproof member 70 from the sealed portion.

Also, as shown in FIG. 3, the seal structure of the bottom surface 17a of the traveling frame 11 and the waterproof member 70 is a double seal structure including a first-stage seal 91 between the frame-side seal surface 51 and waterproof member 70, and a second-stage seal 92 between the downward seal surface 53 and waterproof member 70. Therefore, even when the cleaning water has slightly entered the first-stage seal 91, the cleaning water is largely weakened when entering. Accordingly, the second-stage seal 92 can prevent the entrance of the cleaning water. As a consequence, it is possible to further increase the waterproofness which prevents the cleaning water from entering the waterproof member 70 from the bottom surface 17a of the traveling frame 11.

Likewise, the seal structure of the lower end of the motor housing 32 and the waterproof member 70 is a double seal structure including a first-stage seal 93 between the housing-side seal surface 66 and waterproof member 70, and a second-stage seal 94 between the downward seal surface 64 and waterproof member 70. Therefore, even when the cleaning water has slightly entered the first-stage seal 93, the cleaning water is largely weakened when entering. Accordingly, the second-stage seal 94 can prevent the entrance of the cleaning water. As a consequence, it is possible to further increase the waterproofness which prevents the cleaning water from entering the waterproof member 70 from the lower end of the motor housing 32.

In the present invention, the lawn mower 10 is not limited to an autonomous lawn mower (robotic lawn mower) capable of autonomously traveling without being steered by a worker. For example, the lawn mower 10 is also applicable to a walk behind type self-propelled lawn mower or riding lawn mower which is steered by a worker.

The invention claimed is:

1. A lawn mower comprising:
   a traveling frame provided with traveling wheels;
   a driving source mounting portion formed in the traveling frame;
   a driving source mounted in the driving source mounting portion and including a downward rotating shaft; and
   a lawn mowing unit positioned below the traveling frame and attached to the rotating shaft,
   a lower end of the driving source mounting portion and a lower end of the driving source being exposed from a bottom surface of the traveling frame,
   wherein when the traveling frame is viewed from below, a flat annular frame-side seal surface which is positioned so as to surround the lower end of the driving source mounting portion and an annular lawn mowing unit peripheral surface which is positioned so as to surround the frame-side seal surface are formed in the bottom surface of the traveling frame,
   a waterproof member configured to waterproof a portion between the bottom surface of the traveling frame and the lower end of the driving source is in tight contact with the frame-side seal surface,
   when the lawn mower is viewed from below, the lawn mowing unit peripheral surface is formed over a range from an outer circumferential edge of the frame-side seal surface to at least an outer circumferential edge of the lawn mowing unit,
   at least an inner circumferential edge of the lawn mowing unit peripheral surface is positioned higher than the outer circumferential edge of the frame-side seal surface, and
   a boundary between the outer circumferential edge of the frame-side seal surface and the inner circumferential edge of the lawn mowing unit peripheral surface is formed into a shape of a step over an entire circumference.

2. The lawn mower according to claim 1, wherein the annular lawn mowing unit peripheral surface is positioned higher than other portion of the bottom surface of the traveling frame, which is positioned so as to surround the lawn mowing unit peripheral surface, and inclines upward and inward from the outer circumferential edge of the lawn mowing unit peripheral surface.

3. The lawn mower according to claim 1, wherein
   the driving source includes an electric motor configured to drive the lawn mowing unit, and a motor housing incorporating the electric motor,
   the motor housing projects downward from the bottom surface of the traveling frame, and has a housing-side seal surface on the projecting portion, and
   a lower end portion of the waterproof member is in tight contact with the housing-side seal surface.

4. The lawn mower according to claim 3, wherein
   the housing-side seal surface is a flat annular surface facing the frame-side seal surface, and
   an outer circumferential edge of the housing-side seal surface has a downward surface extending downward over an entire circumference from the outer circumferential edge.

5. The lawn mower according to claim 1, further comprising an annular downward seal surface extending downward over an entire circumference from an inner circumferential edge of the annular frame-side seal surface,
   wherein the waterproof member is in tight contact not only with the frame-side seal surface but also with the downward seal surface.

* * * * *